US006316723B1

(12) United States Patent
Woehl et al.

(10) Patent No.: US 6,316,723 B1
(45) Date of Patent: Nov. 13, 2001

(54) REPAIRABLE BRAID SPLICE

(75) Inventors: Roger Woehl; Edward P. Goett, both of Healdsburg, CA (US)

(73) Assignee: Engineered Transitions Company, Inc., Santa Rosa, CA (US)

( * ) Notice: Subject to any disclaimer, the term of this patent is extended or adjusted under 35 U.S.C. 154(b) by 0 days.

(21) Appl. No.: 09/277,326

(22) Filed: Mar. 26, 1999

(51) Int. Cl.[7] ........................................................ H02G 7/10
(52) U.S. Cl. ...................................... 174/40 CC; 242/556
(58) Field of Search ....................... 174/40 CC; 242/556; 385/95, 99; 451/531; 24/122.3

(56) References Cited

U.S. PATENT DOCUMENTS 5,028,742 * 7/1991 Redman ............................ 174/88 R

* cited by examiner

*Primary Examiner*—Dean A. Reichard
*Assistant Examiner*—W. David Walkenhorst

(74) *Attorney, Agent, or Firm*—Johnson & Stainbrook; Craig M. Stainbrook; Larry D. Johnson

(57) ABSTRACT

A cable braid splice for creating a mechanical and electrical junction between two pieces of metal braid covering a single cable is disclosed, including a coiled ribbon spring having a first and second ends, coils at each end wound inwardly towards one another, a joining segment of ribbon interposed between the coils, and a thin pliable “C” clip for placement partially around a cable bundle and underneath overlapping cable braids. A method of using the splice is also disclosed, including the steps of placing a “C” clip over a wire bundle and underneath two opposing layers of braid so as to encompass approximately half the circumference of the cable bundle but leaving a gap on the other half, pulling the braids into an overlapping relationship with one another, pressing down the braids to form a ridge at the location of the clip, and applying the coiled ribbon spring by wrapping the opposing coils several times around the cable and opposing braids on each side of the ridge such that the joining segment of the coil crosses the ridge at the position of the gap in the “C” clip.

15 Claims, 4 Drawing Sheets

REPAIRABLE BRAID SPLICE

BACKGROUND OF THE INVENTION

1. Field of the Invention

The present invention relates generally to cable braid splicing devices, and more specifically to a method for splicing together two metal braids used to shield electrical cables from electromagnetic interference (EMI). This invention further relates to a splice that can be installed or repaired by hand, without the use of a special tool, and which will accommodate a wide range of cable sizes.

2. Description of the Prior Art

Electrical cables used for carrying power or electrical signals typically require the use of a metal braid to shield the wires from electromagnetic interference. It is frequently necessary to mechanically and electrically join two shorter pieces of braid on a single cable. In such instances it is desirable to have a braid splice that can be installed and repaired by hand, without the need for tooling. Further, it is desirable to have one component that can accommodate a wide range of cable diameters. Moreover, it is desirable to have a splice that can support axial loading of the cable, allow for cable bending, be resistant to wear from vibration and which will have a low electrical resistance. Finally, it is desirable to have a cable splice that can be installed without having to slide a circular device over the end of the cable.

Splicing methods currently in use fail to meet the foregoing objectives. For example, solderable cable splice systems have good electrical properties but are difficult to install and generally not repairable. Several current splicing methods use a ridged ferrule underlying both braids, along with a type of band to strap around the ferrule. These methods require special tools and require that the ferrule be sized closely to that of the wire cable.

Another method of braid splicing employs a special ferrule and a coiled ribbon spring to hold the braid against the ferrule. The ribbon spring can be installed and removed by hand without tooling, but it requires a specially sized ferrule that must be slid over the cable prior to splicing the ends. The ferrule greatly limits the size range of the splice, and also limits cable flexibility at the splice. In addition the need to slide the ferrule over the cable can make repair difficult for a long cable and may necessitate the removal of end fitting hardware.

Braid splicing methods that employ an inside ferrule have several limitations. Firstly, they cause a sizable raised ridge in the cable that can limit the passage of the cable through holes. Secondly, they are unsuited to cable with tightly woven braids as the braid is incapable of expanding over a ferrule; in that event, other termination methods must be used.

Methods of braid splicing that clamp overlapping braids directly onto the cable can fail by one of two means. If the clamping force is great, the braid will damage the wires under the splice. If the clamping force is too small, the splice will fail under an axial load.

Summarily stated, there are no currently existing cable braid splicing methods that are easily installed by hand and that can be readily repaired or replaced.

OBJECTS AND ADVANTAGES

In accordance with the embodiments of the present invention, it is an object of the present invention to provide a cable braid splice that can be installed without the use of tools.

It is a further object of the present invention to provide a cable braid splice that will easily accommodate a wide range of cable sizes.

It is a further object of the present invention to provide a cable braid splice that is installed, replaced, or repaired without having to slide components over the end of the cable to be repaired.

It is yet another object of the present invention to provide a cable braid splice that can be installed without the use of heat.

It is a further object of the present invention to provide a cable braid splice that has bonding strength equivalent to that of the uncut braid.

It is yet another object of the present invention to provide a cable braid splice that does not greatly limit the flexibility of the cable in the region of the splice.

It is still another object of the present invention to provide a cable braid splice with a very low profile that will not greatly affect the diameter of the cable.

It is again an object of the present invention to provide a cable braid splice that is resistant to vibration.

It is yet again an object of the present invention to provide a cable braid splice that has a low electrical resistance.

It is a further object of the present invention to provide a cable braid splice that will not damage cable wires in the area of the splice.

It is yet another object of the present invention to provide a cable braid splice that will provide reliable ground leads from individually shielded wires.

It is still another object of the present invention to provide a cable braid splice that is reparable and electrically secures individual braids to a bulk braid.

It is another object of the present invention to provide a cable braid splice that can be used to terminate a cable braid to an adapter braid sock.

SUMMARY OF THE INVENTION

The cable braid splice and cable braid splicing method of the present invention accomplish each of the foregoing objects. What is disclosed is a cable braid splice, and method for using the same, for creating a mechanical and electrical junction between two pieces of metal braid covering a single cable is disclosed. In the first and simplest embodiment, the first component of the splice comprises a coiled ribbon spring having a first and second ends, configured with coils at each end, wound in opposing directions so that the coils are in contraposition, and a joining segment of ribbon interposed between the coils.

The second component of the splice comprises a thin pliable "C" clip for placement partially around a cable bundle and underneath overlapping cable braids. The clip is made of a springy material that tends to compress inward and to hold itself against the wire bundle. Alternatively, it can be made of a non-springy material that can be easily shaped into a C-shape.

In a second preferred embodiment, the coiled ribbon spring includes an offset at the middle of the joining segment so that the opposing coils wind parallel to one another into a partial side-by-side relationship. In a third preferred embodiment, the coiled ribbon spring includes an arched bridge joining the two coiled ends, such that the coiled ends wind parallel to one another into a complete side-by-side relationship.

The mechanical clamping strength of the coiled ribbon spring can vary according to the thickness of the material, the width of the band, and the tightness of the rolls. Two or three spring sizes can accommodate a full range of cables from below ¼ inch, to over 2 inches.

A method of using the splice is also disclosed, generally comprising the steps of placing a “C” clip over a wire bundle and underneath two opposing layers of braid. The “C” clip is sized to encompass approximately half the circumference of the cable bundle, leaving a gap on the other half. The braids are pulled together and overlapped so that each cover the “C” clip. They are then pressed down to form a ridge at the location of the clip. The coiled ribbon spring is then applied by wrapping the opposing coils several times around the cable and opposing braids on each side of the ridge. The coiled spring is positioned such that the joining segment of the coil crosses the ridge at the position of the gap in the “C” clip.

DETAILED DESCRIPTION OF A PREFERRED EMBODIMENT

A cable braid splice for creating a mechanical and electrical junction between two pieces of metal braid covering a single cable is disclosed. A method for using said cable braid splice is also disclosed.

Figure 1:
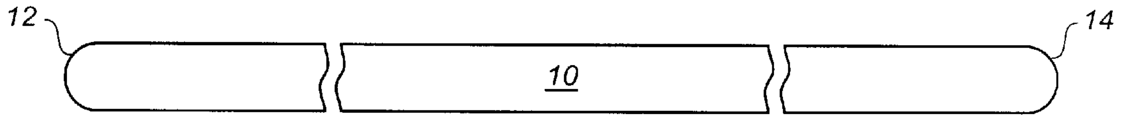
FIG. 1 is a top view of the first preferred embodiment of the uncoiled ribbon spring of the present invention.
Figure 2:
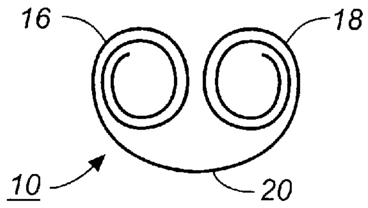
FIG. 2 is an end view of the first preferred embodiment of the coiled ribbon spring of FIG. 1.
Figure 3:
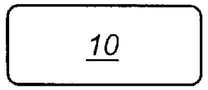
FIG. 3 is a bottom view of the first preferred embodiment of the coiled ribbon spring of FIGS. 1 and 2.

As shown in FIGS. 1 through 3, in its simplest embodiment the first component of the splice comprises a coiled ribbon spring, generally denominated 10, having a first end 12 and a second end 14, and configured with a first coil 16 at the first end, an opposing second coil 18 at the second end wound in the direction opposite that of the first coil so that the coils are in contraposition, and a joining segment of ribbon 20 interposed between the first and second coils.

The coil spring is fabricated from a spring metal, preferably one with good corrosion resistance. The mechanical clamping strength of the coil spring can be determined by the thickness of the material, the width of the band, and the tightness of the rolls. Two or three spring sizes can accommodate a full range of cables from below ¼ inch, to over 2 inches.

Figure 4:
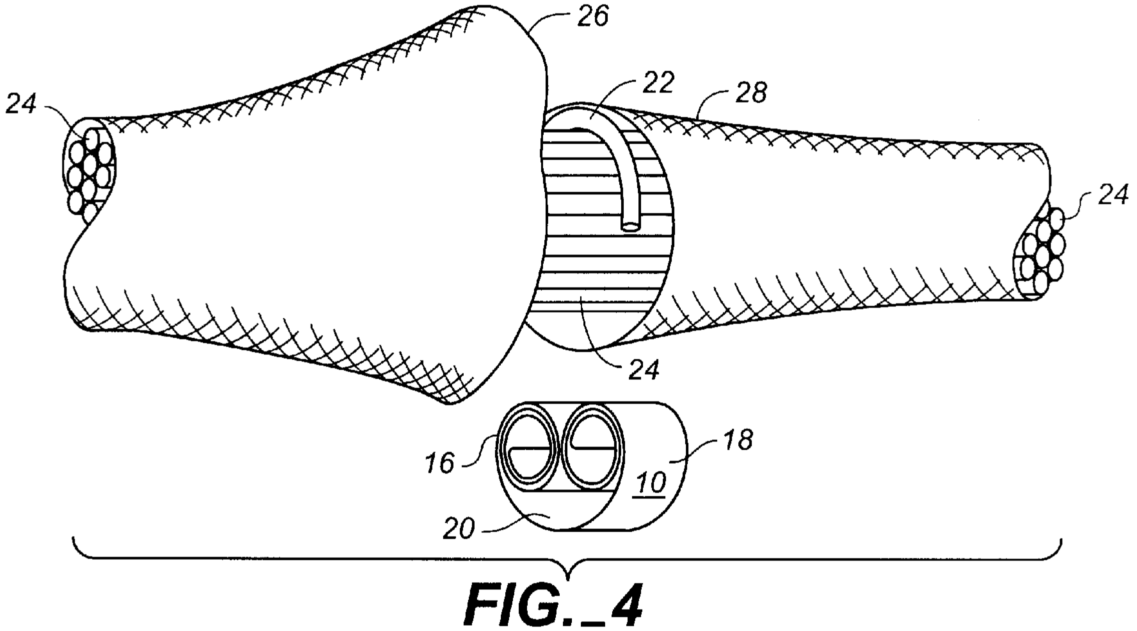
FIG. 4 is a perspective view of the present invention, illustrating an unspliced cable with a “C” clip positioned on a cable bundle and a first embodiment of a coiled ribbon spring positioned for placement.

The second component of the present invention, as illustrated in FIG. 4, comprises a “C” clip 22, preferably fabricated of a pliable thin cylindrical segment of metal or plastic. The clip can be made of a springy material that tends to compress inward and to hold itself against the wire bundle. Alternatively, it can be made of a non-springy material that can be easily shaped into a C-shape; such a material could be a low temper metal. The material of the “C” clip can be provided in a long length so that it can be cut to size at the time of installation, thus allowing the “C” clip to accommodate a wide range of cable sizes.

Figure 5:
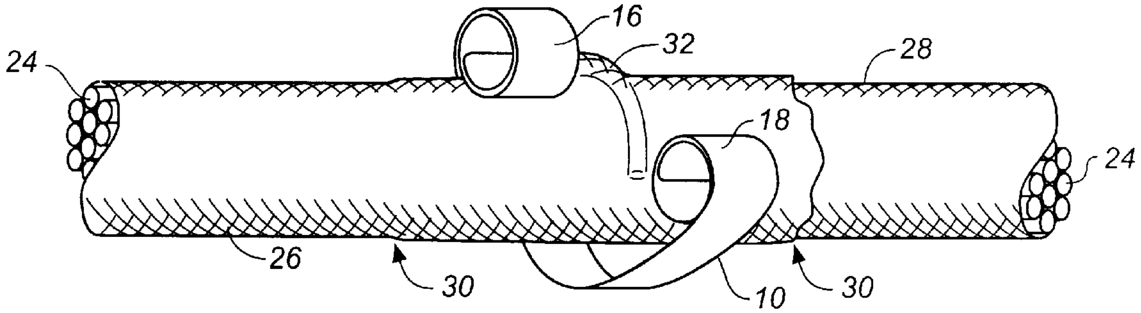
FIG. 5 is a side elevation view of a cable during the splicing process.

FIGS. 4 and 5 show that in general the splice is formed by placing the “C” clip 22 over a wire bundle 24, but underneath two opposing layers of braid, an outer layer 26 and an inner layer 28, in an overlapping region 30. First, the “C” clip 22 is sized to encompass approximately half the circumference of the cable bundle 24, leaving a gap on the other half. The outer layer 26 and inner layer 28 are then pulled together and overlapped so that each cover the “C” clip 22. They are then pressed down to form a distinct ridge 32 at the location of the clip. The coil spring 10 is then applied by wrapping the opposing coils, 16 and 18, several times around the cable 24 and opposing layers, 26 and 28, on each side of the ridge 32 and positioned such that the joining segment 20 of the coil crosses the ridge 32 at the position of the gap in the “C” clip 22.

Figure 6:
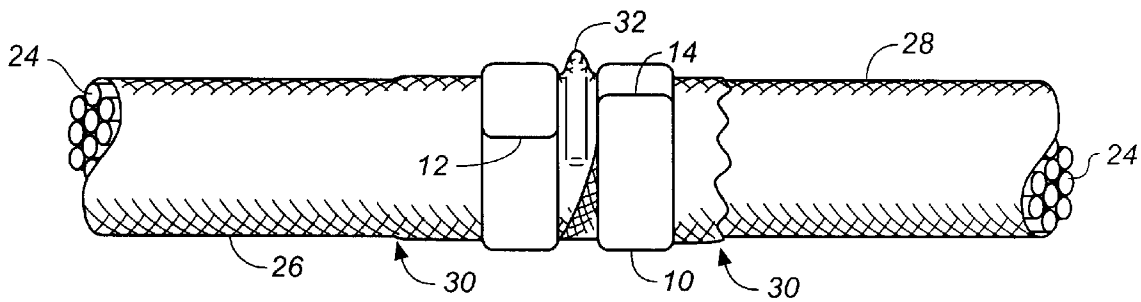
FIG. 6 is a side elevation view of a cable after the splice is completed.

The finished splice, shown in FIG. 6, will have a good electrical connection resulting from the forced contact between the two spliced braids in their overlapping region 30. The “C” clip 22 forces the braid layers upward, and the spring coils, 16 and 18, force the braid layers downward, assuring electrical contact at all times, even during shock and vibration. The raised ridge 32 created by the “C” clip also forms a mechanical junction that is resistant to axial pulling of the cable. The nature of woven metal braid is such that it tends to contract radially as it is pulled axially. This action strengthens the union created at the splice so that the splice will exceed the tensile strength of the braid.

Both the “C” clip and the spring coils can be installed and removed without the use of any tools, and both can be installed simply by wrapping them around the cable from the side, without having to be slid over the end. Additionally, the clip and the spring can accommodate a wide range of cable sizes. Once completed the splice hugs the cable, creating only a slight increase in cable size. The short axial length of the splice does not limit greatly or impair the flexibility of the cable.

The splice can be made without the “C” clip, but with is decreased mechanical bonding, which nonetheless may be suitable or necessary for many applications, as, for example, when a braid is so tightly woven that it cannot be expanded enough to slide the “C” clip underneath. In such instances the clip can be omitted. In contrast, the mechanical and electrical strength of the bond can be increased by increasing the thickness of the "C" clip.

Figure 7:
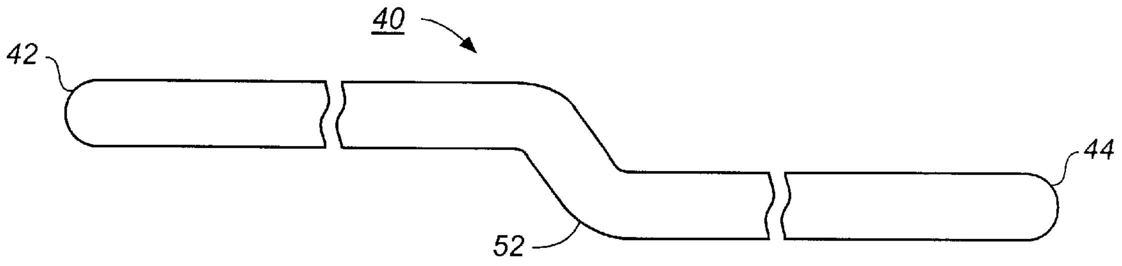
FIG. 7 is a top view of the second preferred embodiment of the uncoiled ribbon spring.
Figure 8:
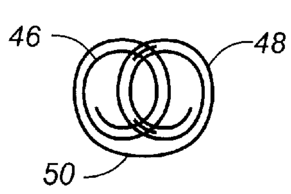
FIG. 8 is an end view of the second preferred embodiment of the coiled ribbon spring.
Figure 9:
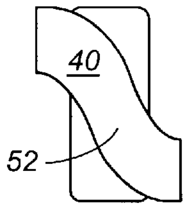
FIG. 9 is a bottom view of the second preferred embodiment of the coiled spring.

FIGS. 7–9 show an alternative, second embodiment of the coiled spring as described above. This second embodiment comprises a coiled ribbon spring, generally denominated 40, having a first end 42 and a second end 44, and configured with a first coil 46 at the first end, an opposing second coil 48 at the second end wound in the direction opposite that of the first coil so that the coils wind directly toward one another, and a joining segment of ribbon 50 interposed between the first and second coils. The joining segment has an offset at the middle of the joining segment of the coiled ribbon spring, such that the opposingly coiled ends do not touch. The offset reduces the space required for the coil spring to transition from one side of the "C" clip to the other.

The repairable braid splice described and disclosed above generally comprises a first inner part that creates a ridge when placed under two layers of overlapping braid in a splice, and a second outer piece that clamps the braid down on either side of the ridge by means of a coiled spring band wrapped in opposing directions around the cable. In some applications, however, it is not desirable to clamp braid down onto the cable as is done with the simple "C" clip. In those applications, an inner sleeve or ferrule is necessary to create a fixed diameter base under the braid. This helps to ensure that the outside clamp has a solid foundation that will not change or settle over time as could be the case for a loosely woven wire bundle. Further, it protects the wires from any compression force that can be important for sensitive coaxial cables. Although a fixed diameter sleeve is desirable, using a pre-sized sleeve has many of the limitations outlined above.

Figure 10:
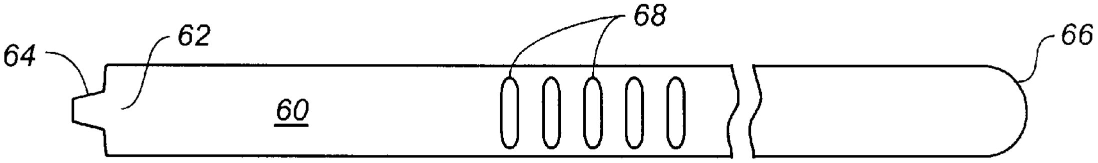
FIG. 10 is a top view of an uncoiled adjustable inner ribbon sleeve.
Figure 11:
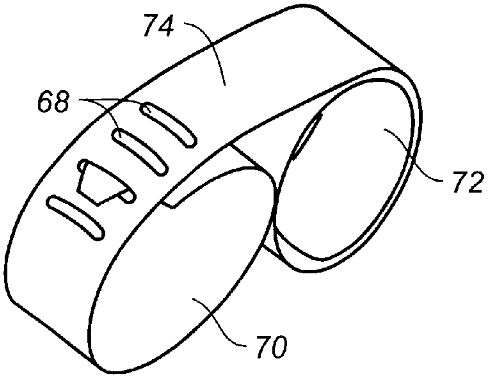
FIG. 11 is a perspective view of the adjustable inner ribbon sleeve of FIG. 10, partially coiled.
Figure 12:
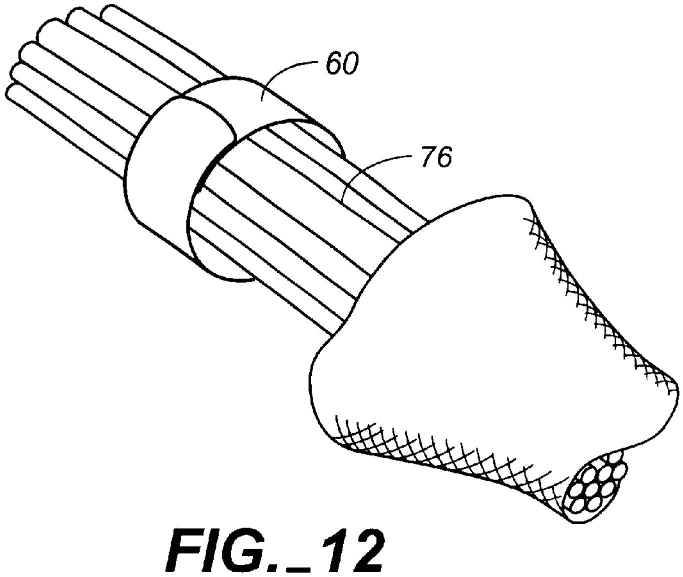
FIG. 12 is a perspective view of the adjustable sleeve of FIGS. 10 and 11, fully coiled and wrapped around a cable.

Accordingly, an alternative splicing method includes the use of an inner member that resolves the limitations by creating an adjustable inner sleeve that can be locked into a fixed diameter in discreet size increments. As shown in FIGS. 10–11, the sleeve is comprised of a coiled spring band 60, having a tabbed end 62 with an integrally formed tab 64, an untabbed end 66, a plurality of mating lateral slots 68 around the band, a first coil 70 at said tabbed end, a second coil at said untabbed end 72, and a joining segment of band 74 between said first and second coils. The tab 64 can be inserted into any of said slots 68 to lock the inner wrap of the first coil to a fixed diameter. Subsequent overlying wraps by the second coil 72 serve to increase the rigidity of the band and to smoothly cover the slight ridge created by the tab end inserted through the slot. The coil of the spring sleeve is such that it must be expanded to fit over a cable. The spring force of each subsequent wrap drives the tab into the slot. FIG. 12 is a perspective view showing the adjustable sleeve in place around a cable bundle 76.

The adjustable sleeve can be wrapped around a cable and locked to a suitable diameter without having to slide the sleeve over the end of the cable. A single size of adjustable sleeve can accommodate a wide range of cable sizes reducing the number of components that must be made and inventoried.

Figure 13:
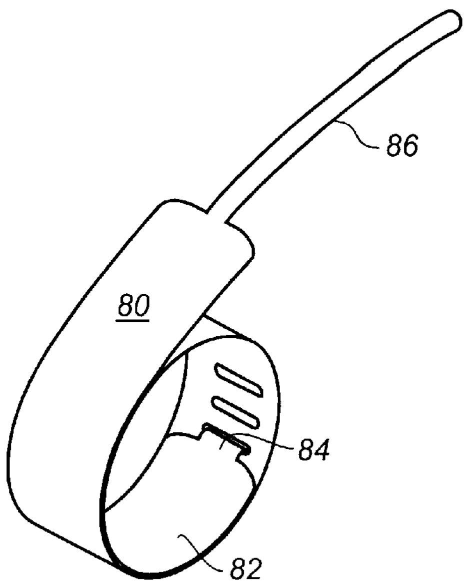
FIG. 13 is a perspective view of an alternative embodiment of the adjustable sleeve with extended tab and tail.
Figure 14:
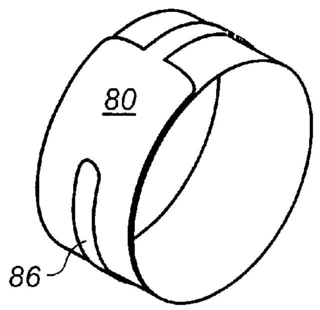
FIG. 14 is a perspective view of the adjustable sleeve tab of FIG. 13 with the tab locking in slot.

When the adjustable inner sleeve is applied to a braid splice, it can use a separate "C" clip as previously described, or it can include a clip as an integral part of the sleeve constructed as described now. Accordingly, an alternative embodiment of the adjustable inner sleeve is shown in FIGS. 13–14. This embodiment, generally denominated 80, comprises a coiled ribbon having a coiled tabbed end 82 with an integrally formed tab 84, a plurality of lateral slots 86 for mating with said tab, and an extended thinner tail 86 that extends so as to wrap around the sleeve to form a ridge in the overlapping braids, as earlier described. The tail may have greater thickness than the rest of the spring coils, so as to create a sufficient ridge. One method of adding thickness to the tail entails slipping a flexible plastic sleeve over the extended thinner tail 86 before installation. At the time of installation, the tail can be wrapped around the sleeve and cut to length to allow a gap.

The previously described embodiments and associated splicing methods required the "C" clip to have a gap for the coiled ribbon spring to pass through so that the opposing wraps could be wound around each side of the ridge. In a third alternative embodiment of the coiled ribbon spring, illustrated in FIGS. 15–17, the coiled spring includes an arched bridge that allows the coil spring to pass over the top of the ridge, thereby eliminating the need for a gap in the "C" clip. The arched bridge simplifies assembly because the user does not have to co-locate the bridge and the gap.

Figure 15:
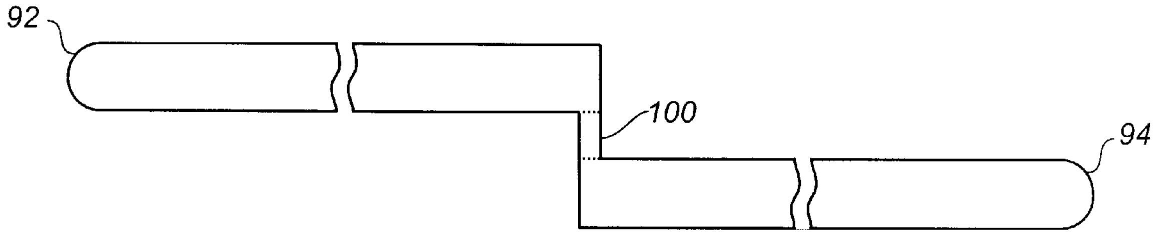
FIG. 15 is a top view of uncoiled spring band with an arched bridge.
Figure 16:
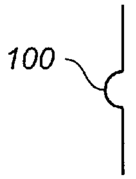
FIG. 16 is an end view of the uncoiled spring band with an arched bridge of FIG. 15.
Figure 17:
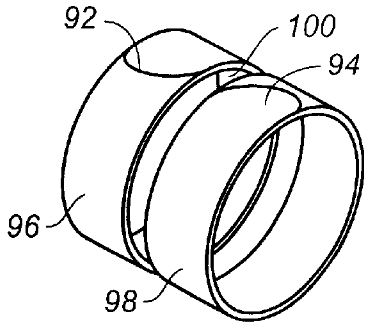
FIG. 17 is a perspective view of a coiled spring band with an arched bridge.

FIG. 15 is a top view of a third preferred embodiment of the coiled ribbon spring of the present invention, illustrating the uncoiled spring band with an arched bridge. FIG. 16 is an end view of the uncoiled ribbon spring band with an arched bridge of FIG. 15. And FIG. 17 is a perspective view of the coiled ribbon spring band with an arched bridge. These views illustrate that the third preferred embodiment of the coiled ribbon spring of the present invention, generally denominated 90, comprises a first end 92 and a second end 94, and configured with a first coil 96 at the first end, an opposing second coil 98 at the second end wound in the direction opposite that of the first coil so that the ribbon spring coils in on itself and the first and second coils are parallel and adjacent to one another in a side-by-side relationship, and an arched bridge 100 interposed between and joining the adjacent coils.

When used in conjunction with the inner sleeve illustrated in FIGS. 13 and 14 and described above, the third preferred embodiment of the coiled ribbon spring, having an arched bridge, eliminates the need for a thicker tail or the need to cut it to size. The tail can be wrapped around the sleeve to its capacity to create a continuous ridge when placed under the braid. The arched bridge allows the outer spring band to pass over the ridge without the need of a gap.

The braid splice of the present invention can serve a valuable function as a means to terminate a cable shield in an end fitting that has a pre-attached braid sock. Cable braids are often tightly woven and will not expand sufficiently to slide over the ferrule of an electrical end fitting. In such instances a cable with a pre-attached braid sock is used. The braid sock is loosely woven to accommodate a wide size range. The sock can be spliced to the cable by the method of this invention.

Cable shields are often the common ground plane for individually shielded wires passing through the cable. The shields from the individual wires must be electrically coupled to the common ground of the bulk cable shield. The braid splice of this invention readily accommodates termination of these individual shields. Ground leads can be attached to the individual shields by one of several common methods, including pig tailing or solder sleeves. The ground lead can then be sandwiched between the two layers of braid in the overlapping region under the braid splice, thus providing them with a reliable ground path to both braid layers.

Often individual ground leads must be terminated to the bulk shield at the end of a cable even though no secondary braid is to be spliced. This function can be accomplished with the braid splice of this invention. Two methods of securing the braid are possible. The individual leads can be simply folded on the top of the bulk braid, with the ribbon spring wrapped around both the leads and bulk braid. As a second method, the ribbon spring can be wrapped around the bulk shield several times, then the shield leads can be placed over the band, and several more wraps can be taken, thereby sandwiching the leads between the several wraps of the spring. Because the coiled ribbon spring is fabricated of metal, it provides an electrical path to the bulk braid. In these instances mechanical joining is not necessarily an issue, and as such does not require the use of the "C" clip. Further the coiled ribbon spring need only be wrapped in a single location, and not in two locations as is preferred when two braids are spliced.

For cable with individually shielded wires and no bulk braid the leads can be terminated to an electrical end fitting with a braid sock and a coiled ribbon spring by the means previously described. If desired, a piece of tape can be wrapped around the ribbon spring for added security.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A cable braid splice for creating a mechanical and electrical junction between two cable braids, comprising:

a coiled ribbon spring having a first end and a second end, a first coil at said first end, a second coil at said second end, each of said first and second coils wound inwardly towards one another, a joining segment interposed between and connecting said first and second coils; and an inner sleeve for placement entirely around a cable bundle and underneath overlapping cable braids, comprising a coiled ribbon having a coiled tabbed end with an integrally formed tab, a generally rounded end, and a plurality of lateral slots for mating with said tab, wherein said inner sleeve has an extended thinner tail at the end opposite said tabbed end, said tail extending so as to wrap around said inner sleeve to form a ridge in the overlapping braids when in use.

2. The cable splice of claim 1, wherein said joining segment of said coiled ribbon spring is straight, such that said first and second coils physically abut at the approximate middle of said joining segment.

3. The cable splice of claim 1, wherein said joining segment of said coiled ribbon spring further includes an offset such that said first and second coils wind towards one another in a generally parallel fashion and rest partially side-by-side when coiled.

4. The cable splice of claim 1, wherein said joining segment of said coiled ribbon spring further includes an arched bridge interposed between and perpendicular to said first and second coils such that said first and second coils wind towards one another in a generally parallel fashion and rest in a substantially side-by-side relationship when coiled.

5. A cable braid splice for creating a mechanical and electrical junction between two cable braids, comprising:

a coiled ribbon spring having a first end and a second end, a first coil at said first end, a second coil at said second end, each of said first and second coils wound inwardly towards one another, a joining segment interposed between and connecting said first and second coils, wherein said joining segment of said coiled ribbon spring includes an arched bridge interposed between and perpendicular to said first and second coils such that said first and second coils wind towards one another in a generally parallel fashion and rest in a substantially side-by-side relationship when coiled; and a generally cylindrical, flexible clip for placement partially around a cable bundle and underneath overlapping cable braids so as to form a transverse ridge on the outside surface of the cable braids and interposed between said first and second coils when in use.

6. A method of splicing cable braids, comprising the steps of:

placing a generally cylindrical, flexible clip over a wire bundle and underneath two opposing layers of braids so as to encompass approximately half the circumference of the wire bundle but leaving a gap on the other half;

pulling the cable braids into an overlapping relationship with one another and over the flexible clip;

pressing down the braids to form a ridge at the location of the clip; and wrapping a coiled ribbon spring several times around the cable bundle and opposing braids on each side of the ridge, said ribbon spring having a first end and a second end, a first coil at said first end, a second coil at said second end, each of said first and second coils wound inwardly towards one another, a joining segment interposed between and connecting said first and second coils, wherein said wrapping step includes using a coiled ribbon spring having an arched bridge interposed between and perpendicular to said first and second coils, said bridge to fit over the ridge formed by the placement of the cylindrical, flexible clip.

7. A cable braid splice for creating a mechanical and electrical junction between two cable braids, comprising:

a coiled ribbon spring having a first end and a second end, a first coil at said first end, a second coil at said second end, each of said first and second coils wound inwardly towards one another, a joining segment interposed between and connecting said first and second coils, wherein said joining segment of said coiled ribbon spring includes an arched bridge interposed between and perpendicular to said first and second coils such that said first and second coils wind towards one another in a generally parallel fashion and rest in a substantially side-by-side relationship when coiled; and a generally cylindrical, flexible clip for placement partially around a cable bundle and underneath overlapping cable braids so as to form a transverse ridge on the outside surface of the cable braids and interposed between said first and second coils when in use.

8. The cable splice of claim 7, wherein said joining segment of said coiled ribbon spring is straight, such that said first and second coils physically abut at the approximate middle of said joining segment.

9. The cable splice of claim 7, wherein said joining segment of said coiled ribbon spring further includes an offset such that said first and second coils wind towards one another in a generally parallel fashion and rest partially side-by-side when coiled.

10. The cable splice of claim 7, wherein said flexible clip is fabricated from metal.

11. The cable splice of claim 7, wherein said flexible clip is fabricated from plastic.

12. A method of splicing cable braids, comprising the steps of:

placing a generally cylindrical, flexible clip over a wire bundle and underneath two opposing layers of braids so as to encompass approximately half the circumference of the wire bundle but leaving a gap on the other half;

pulling the cable braids into an overlapping relationship with one another and over the flexible clip;

pressing down the braids to form a ridge at the location of the clip; and wrapping a coiled ribbon spring several times around the cable bundle and opposing braids on each side of the ridge, said ribbon spring having a first end and a second end, a first coil at said first end, a second coil at said second end, each of said first and second coils wound inwardly towards one another, a joining segment interposed between and connecting said first and second coils, wherein said wrapping step further includes using a coiled ribbon spring having an arched bridge interposed between and perpendicular to said first and second coils, said bridge to fit over the ridge formed by the placement of the cylindrical, flexible clip.

13. The method according to claim 12, wherein said wrapping step further comprises the step of wrapping the coiled ribbon spring around the cable bundle and opposing braids such that the joining segment of the coil crosses the ridge at the position of the gap in the flexible clip.

14. The method according to claim 12, wherein said wrapping step further includes using a coiled ribbon spring having a straight joining segment.

15. The method according to claim 12, wherein said wrapping step further includes using a coiled ribbon spring having an offset.

* * * * *